(12) United States Patent
Ito et al.

(10) Patent No.: US 6,179,597 B1
(45) Date of Patent: Jan. 30, 2001

(54) AUTOMATIC LUBRICATOR FOR INJECTION MOLDING MACHINE

(75) Inventors: Susumu Ito, Hino; Koichi Nishimura, Susono; Masaaki Kumasaka, Minamitsuru-gun, all of (JP)

(73) Assignee: Fanuc Ltd., Yamanashi (JP)

( * ) Notice: Under 35 U.S.C. 154(b), the term of this patent shall be extended for 0 days.

(21) Appl. No.: 09/236,280

(22) Filed: Jan. 22, 1999

(30) Foreign Application Priority Data

Jan. 22, 1998 (JP) .................................................. 10-024025
May 26, 1998 (JP) .................................................. 10-160033

(51) Int. Cl.[7] .................................................. B29C 45/83
(52) U.S. Cl. ......................... 425/107; 425/143; 425/157; 425/159; 425/160
(58) Field of Search .................. 425/107, 155, 425/156, 157, 159, 160, 143

(56) References Cited

U.S. PATENT DOCUMENTS

| 5,182,720 | 1/1993 | Beck et al. . |
| 5,297,953 | 3/1994 | Wang . |

FOREIGN PATENT DOCUMENTS

| 0303938A2 | 2/1989 | (EP) . |
| 0439626A1 | 8/1991 | (EP) . |
| 0612891A1 | 8/1994 | (EP) . |
| 08207108 | 8/1996 | (EP) . |
| 60-159025 | 8/1985 | (JP) . |
| 60-35837 | 10/1985 | (JP) . |
| 4-71820 | 3/1992 | (JP) . |
| 5-636 | 1/1993 | (JP) . |
| 11-151741 | 6/1999 | (JP) . |

Primary Examiner—Tim Heitbrink
(74) Attorney, Agent, or Firm—Staas & Halsey LLP

(57) ABSTRACT

An automatic lubricator for an injection molding machine, capable of performing proper lubrication in accordance with operation environment of the injection molding machine. A lubrication interval Ls is controlled according to length of cycle time S of the injection molding machine so that the lubrication interval Ls is increased when the cycle time S is long and it is decreased when the cycle time S is short. Further, when a ball screw temperature t1 is high the lubrication interval Ls is accordingly decreased by $\Delta DL$, and when the ball screw temperature t1 is low the lubrication interval Ls is accordingly increased by $\Delta DL$. Also, when the ambient temperature t2 is high the operation time Tp of a lubricating pump 2 is decreased, and when the ambient temperature t2 is low the operation time Tp is increased to stabilize the lubrication quantity.

15 Claims, 6 Drawing Sheets

FIG. 3
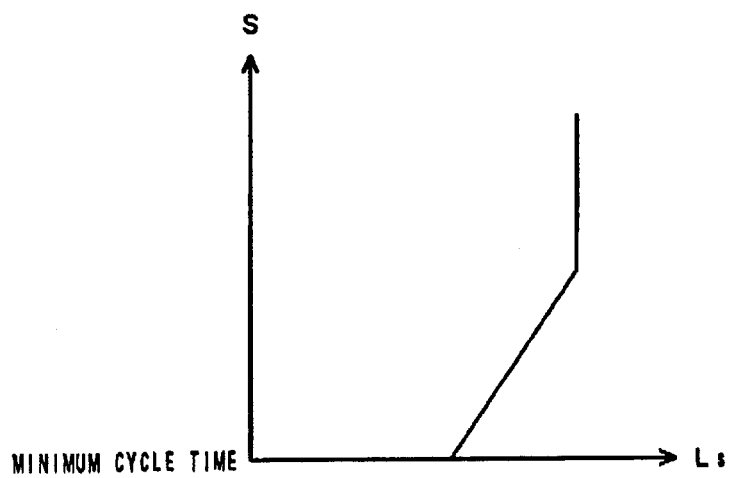
FIG. 4
| t1 | 40~30 | 30~20 | 20~10 | 10~ |
|---|---|---|---|---|
| ΔL | ΔL1 | ΔL2 | ΔL3 | ΔL4 |
FIG. 5
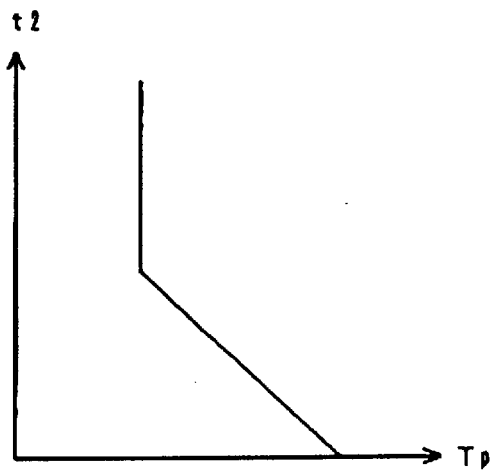

AUTOMATIC LUBRICATOR FOR INJECTION MOLDING MACHINE

BACKGROUND OF THE INVENTION

1. Field of the Invention

The present invention relates to an improvement in an automatic lubricator for an injection molding machine.

2. Description of the Related Art

Movable parts of an injection molding machine, for example, a sliding part or a rotating part in an injection mechanism section, a mold clamping section, a mold thickness adjusting section and an ejector mechanism section are generally lubricated by direct supply operation of lubricant using a grease gun or the like.

An automatic lubricator which is used to perform centralized lubrication by using an electrically-driven lubricating pump connected to piping has been known conventionally. However, the conventional automatic lubricator performs only lubricating operation by automatically operating a lubricating pump at predetermined lubrication intervals. If a variation occurs in the operation environment such as cycle time and ambient temperature of the injection molding machine, the conventional lubricator cannot respond to this variation, so that excess or insufficient lubricating operation is performed undesirably.

Also, even if the lubrication intervals are fixed, the lubrication quantity per one pump operation is varied by the operation environment, so that the residual quantity of grease in a reserve tank cannot be predicted accurately. Therefore, there is a fear that the lubricant refilling work delays, resulting in hindrance to lubricating operation.

SUMMARY OF THE INVENTION

An object of the present invention is to provide an automatic lubricator for an injection molding machine, capable of performing proper lubricating operation in accordance with the operation environment of injection molding machine.

The automatic lubricator of the present invention comprises a lubricating pump for supplying lubricant to movable parts of the injection. molding machine, and a controller for controlling an interval of operation of the lubricating pump or operating time of the lubricating pump for one lubrication based on at least one of cycle time of injection molding machine, temperature of the lubricated parts and ambient temperature.

In the case where the controller controls the lubricating pump to perform lubricating operation each time when set number of shots are completed and also adaptively controls the lubrication interval by adjusting the set number of shots, the controller makes the lubricating pump perform lubricating operation each time when at least one of the number of injection operations and the number of mold clamping operations reaches the set number of shots. Thereby, even when only a particular portion of injection molding machine is driven as in the case of mold clamping control operation and purging operation, running out of the lubricant can be prevented.

Also, by displaying at least one of residual quantity of the lubricant in a reserve tank, remaining time until refilling of the lubricant is needed, and date and time when the refilling of the lubricant is needed on a display, the running out of lubricant can be prevented.

BRIEF DESCRIPTION OF THE DRAWINGS

FIG. 3 is a diagram showing one example of a data file for controlling the lubrication interval based on the cycle time;

FIG. 4 is a table showing one example of a data file for correcting the lubrication interval based on the ball screw temperature;

FIG. 5 is a diagram showing one example of a data file for controlling the pump operation time based on the ambient temperature;

DETAILED DESCRIPTION OF THE PREFERRED EMBODIMENTS

One embodiment in which the present invention is applied to an electrically-driven toggle type injection molding machine will be described below with reference to the accompanying drawings.

Figure 1:
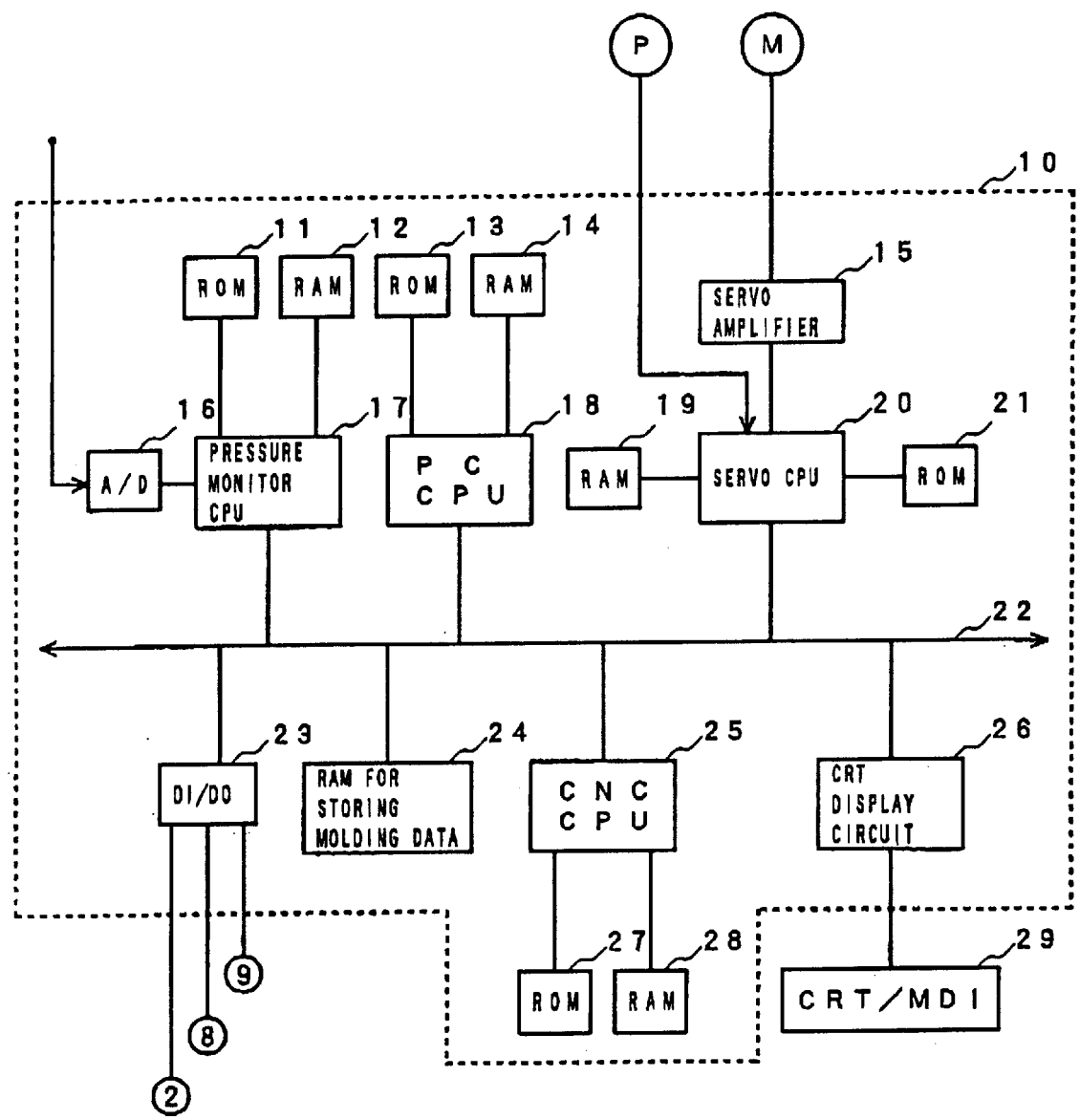
FIG. 1 is a block diagram showing a principal portion of a controller for an electrically-driven toggle type injection molding machine in accordance with one embodiment of the present invention.
Figure 2:
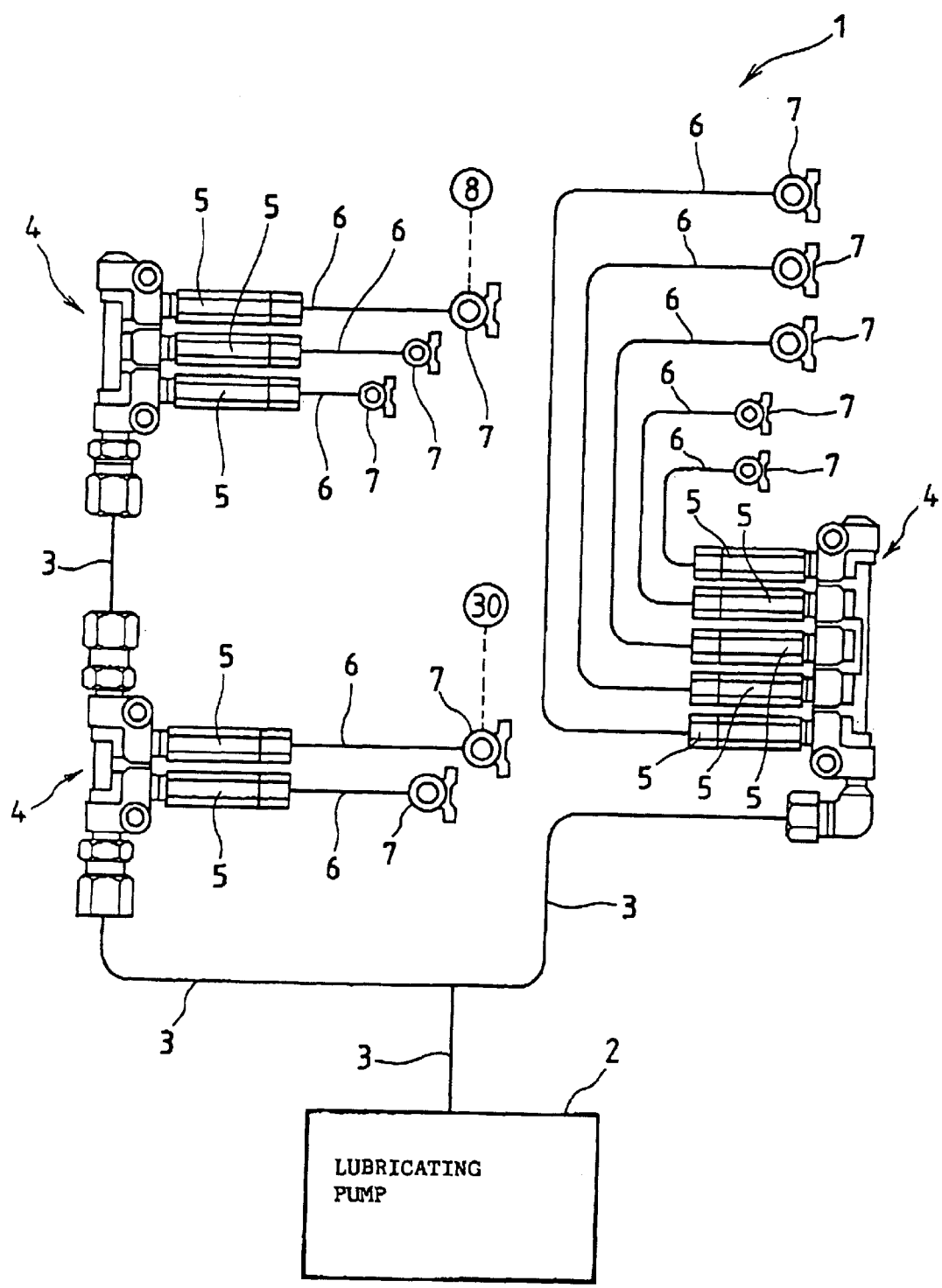
FIG. 2 is a block diagram showing a principal portion of an automatic lubricator in accordance with the embodiment.

FIG. 1 is a block diagram showing a principal portion of a controller 10 for an electrically-driven toggle type injection molding machine, which is also used as a control section for an automatic lubricator, and FIG. 2 is a block diagram showing a principal portion of an automatic lubricator 1 adaptively controlled by the controller 10.

As shown in FIG. 1, the controller 10 has a CNC CPU 25 which is a microprocessor for numerical control, a PC CPU 18 which is a microprocessor for programmable controller, a servo CPU 20 which is a microprocessor for servo control, and a pressure monitor CPU for performing sampling process of pressure by detecting an injection pressure and screw back pressure from a pressure detector located on the body side of injection molding machine via an A/D converter 16. In this controller 10, information transfer can be effected between the microprocessors by selecting the mutual input/output via a bus 22.

The PC CPU 18 is connected with a ROM 13 which stores a sequence program for controlling the sequence operation of injection molding machine, a program necessary for adaptive control of the automatic lubricator 1, and the like, and a RAM 14 which is used for temporary storage of arithmetic data etc. The CNC CPU 25 is connected with a ROM 27 which stores a program for controlling the injection molding machine as a whole, and a RAM 28 which is used for temporary storage of arithmetic data etc.

Also, each of the servo CPU 20 and the pressure monitor CPU 17 is connected with a ROM 21 storing a control program for servo control only and a RAM 19 used for temporary storage of data, and a ROM 11 storing a control program regarding sampling process etc. of injection pressure and a RAM 12 used for temporary storage of data, respectively.

Further, the servo CPU 20 is connected with servo amplifiers 15 for driving servomotors of axes for mold clamping, for injection, for screw rotation, for ejector, etc. based on a command from the CPU 20. The output from a position and velocity detector installed on the servomotor of each axis is returned to the servo CPU 20. The present position of each axis is calculated by the servo CPU 20 based on the feedback signal from the position and velocity detector, and updated and stored in the present position storage register for each axis.

FIG. 1 shows only a servo amplifier 15 for injection, a servomotor M, and a position and velocity detector P. The configurations for all axes for mold clamping, for ejector, etc. are equal to this. However, for screw rotation only, the present position need not be detected, and the velocity has only to be detected.

An interface 23 is an element for sending an ON/OFF control signal to a lubricating pump 2 provided on the automatic lubricator 1. In addition, the temperature measurement values from a temperature detector 8 installed to a lubrication section on the injection molding machine side, for example, a ball screw for driving a toggle, and a thermometer 9 disposed at a molding work place where the injection molding machine is installed are input to the interface 23.

A manual data input device 29 with display is connected to the bus 22 via a CRT display circuit. The selection of graph display screen and function menu, the input operation of various data, and the like can be performed with this input device 29. The input device 29 is provided with ten keys for inputting numerical data and various function keys.

A nonvolatile memory 24 is a molding data storage memory for storing the molding conditions, various setting values, parameters, macro variables, and the like regarding the injection molding work. The nonvolatile memory 24 also stores a data file necessary for adaptive control of the automatic lubricator 1.

Also, the nonvolatile memory 24 stores the data regarding the operation state of injection molding machine, for example, the data for each shot as to the aforementioned injection pressure and screw back pressure and the cycle time for each shot, as in the prior art.

By the above-described configuration, the PC CPU 18 controls the sequence operation of the whole injection molding machine, and the CNC CPU 25 distributes movement commands to the servomotors of axes based on the operation program in the ROM 27, the molding conditions in the nonvolatile memory 24, and the like. Also, the servo CPU 20 carries out servo control such as position loop control, velocity loop control, and current loop control, as in the prior art, based on the movement command distributed to each axis and the feedback signal of position and velocity detected by the position and velocity detector, executes a so-called digital servo process, and drives the servomotor of each axis.

As shown in FIG. 2, the automatic lubricator 1 adaptively controlled by the PC CPU 18 of the controller 10 includes a lubricating pump 2 formed integrally with a reserve tank, main pipes 3 for introducing grease, which is delivered from the lubricating pump 2, to the injection molding machine side, junctions 4 connected to the main pipe 3, distributors 5 provided on the junction 4, branch pipes 6 for introducing grease, which is distributed by the distributor 5, to a lubricating unit 7 at each part of injection molding machine, and lubricating units 7 provided in the sliding section and rotating section of injection molding machine to be lubricated.

The lubricating unit 7 is made up of, for example, a sliding sleeve interposed between a movable platen and a tie bar of injection molding machine, a pivotally mounting sleeve provided in a rocking section of toggle mechanism, and a socket installed on a ball screw for injection or for driving the toggle. As described above, in this embodiment, the temperature detector 8 is installed to the lubricating unit 7 formed by the socket installed to the ball screw for driving the toggle.

The lubricating unit 7 has various sizes, large and small, depending on the installation position thereof. Also, since there is a difference in the substantial number of sliding motions and rotating motions per time, the distribution percentage of grease to each lubricating unit 7 can freely be set manually by each distributor S provided on each junction 4.

Figure 6:
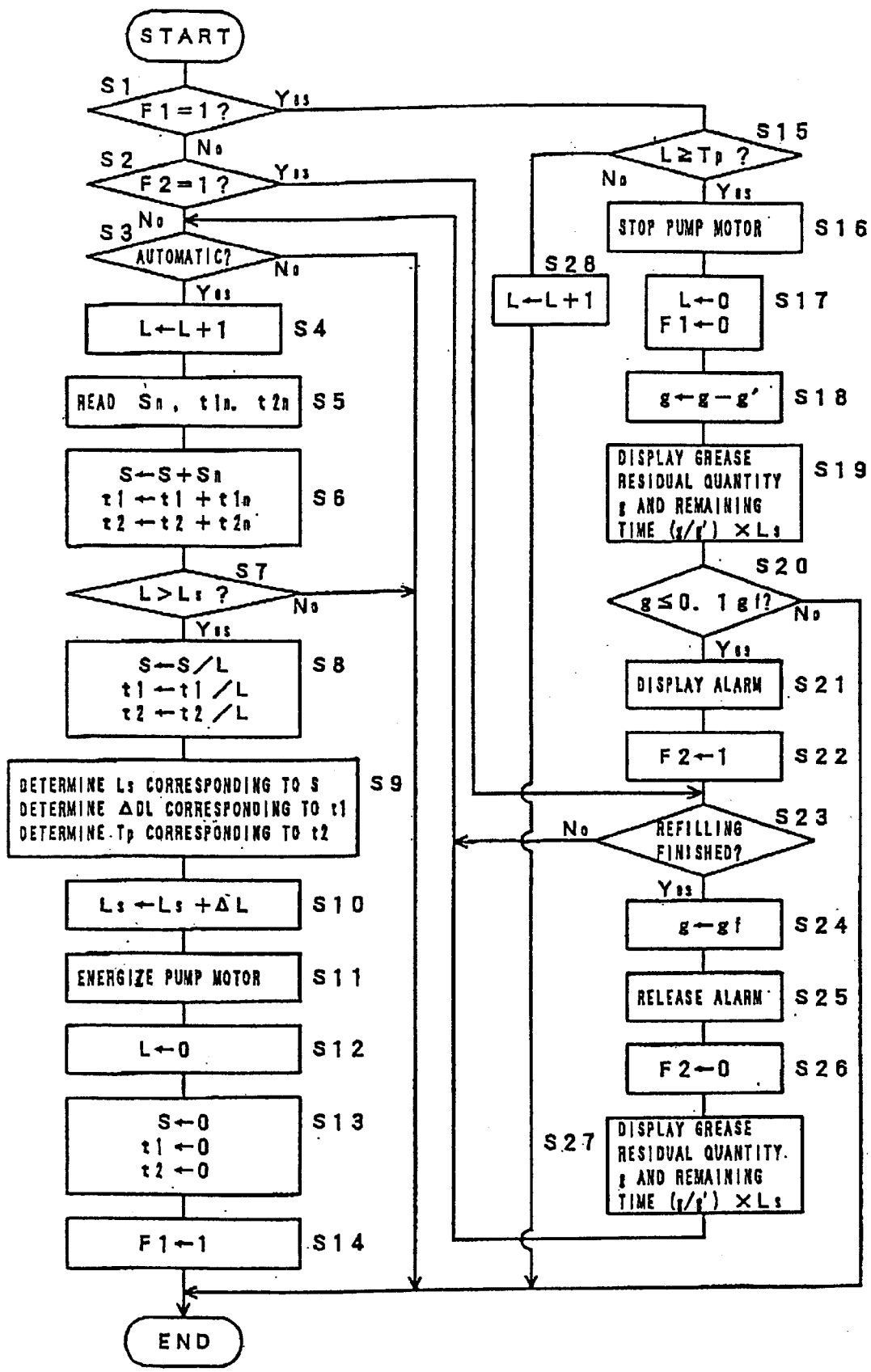
FIG. 6 is a flowchart showing one example of process for carrying out adaptive control of automatic lubricating operation.

Next, the lubricating operation of the automatic lubricator 1 will be described with reference to a flowchart (FIG. 6) for automatic lubrication process executed repeatedly for each predetermined cycle by the PC CPU 18 of the controller 10.

The PC CPU 18, which has started the automatic lubrication process for each predetermined cycle, first determines whether or not a flag F1 showing automatic lubricating operation being executed is set (Step S1), and whether or not a flag F2 showing a waiting state of refilling of grease to the reserve tank is set (Step S2). Since the automatic lubricating operation is not being performed at the initial stage after the start of process, and the reserve tank is full of grease, neither flag is set. Therefore, the determination results of Steps S1 and S2 are No.

Then, the PC CPU 18 determines whether automatic operation is selected or manual operation (including semi-automatic operation) is selected as the operation mode of injection molding machine (Step S3). If automatic operation is not selected, the automatic lubrication process of this cycle is finished without being further executed. Therefore, in the case of manual operation mode, substantial automatic lubrication process is not executed.

On the other hand, if automatic operation is selected, the PC CPU 18 first increases the value of a counter L forming a timer by 1, and updates and stores the elapsed time from the previous automatic lubricating operation (Step S4). Then, the PC CPU 18 reads the present value tin of ball screw temperature via the temperature detector 8 and the present value t2n of ambient temperature via the thermometer 9, and also reads the present value Sn of cycle time of molding work stored in the nonvolatile memory 24 (Step S5), and adds these values to integrating registers t1, t2 and S, respectively (Step S6).

Next, the PC CPU 18 determines whether or not the present value of the counter L reaches the initial setting value Ls of lubrication interval (Step S7). If the present value does not reach Ls, the automatic lubricating operation need not be performed, so that the automatic lubrication process of this cycle is finished without being further executed.

Until the present value of the counter L reaches the initial setting value Ls of lubrication interval, only the processes of Steps S1 to S7 are repeatedly executed in the same manner as described above.

During the time when such processes are repeatedly executed, when the fact that the present value of the counter L has reached the initial setting value Ls of lubrication interval is detected by the determination process of Step S7, and it is verified that the lubrication time has come, the PC CPU 18 divides each value in the integrating registers t1, t2 and S by the present value of the counter L, and thereby determines a mean value t1 of ball screw temperature and a mean value t2 of ambient temperature during the time from the previous automatic lubricating operation to the present time, and a mean value S of cycle time of molding work (Step S8). Further, the PC CPU 18 determines a correction value ΔDL of lubrication interval corresponding to the mean value t1 of ball screw temperature and operation time Tp of the lubricating pump 2 corresponding to the mean value t2 of ambient temperature (Step S9), and adds the correction value ΔDL to the lubrication interval Ls to correct the value of lubrication interval Ls to a value Ls considering the cycle time S and the ball screw temperature t1 of injection molding machine (Step S10).

FIGS. 3, 4 and 5 each show an example of a data file in the nonvolatile memory 24 used for the process of Step S9.

FIG. 3 shows a data file showing a relationship between the mean time S of cycle time and the lubrication interval Ls. In this embodiment, the lubrication interval Ls is set so that the lubrication interval Ls decreases as the cycle time S is shortened and the consumption of grease becomes heavy. Also, the lubrication interval Ls is set so that even when the cycle time S is long, the minimum necessary lubricating operation is performed at some intervals, considering the deterioration, evaporation, etc. of grease.

FIG. 4 shows a data file showing a relationship between the ball screw temperature t1 representing the temperature of grease and the correction value ΔDL. The correction value ΔDL is set so that when the ball screw temperature t1 is low and the load of injection molding machine is low, the lubrication interval Ls is increased, and when the ball screw temperature t1 is high and the load of injection molding machine is high, the lubrication interval Ls is decreased.

FIG. 5 shows a data file showing a relationship between the ambient temperature t2 and the operation time Tp of the lubricating pump 2. The pump operation time Tp is set so that when the ambient temperature t2 is low and the viscosity of grease is high, the pump operation time Tp is increased, and when the ambient temperature t2 is high and the viscosity of grease is low, the pump operation time Tp is decreased.

The PC CPU 18, which has reset the values of the pump operation time Tp and the lubrication interval Ls, gives an operation command to the lubricating pump 2 to start the delivery of grease (Step S11), resets the values of the counter L and integrating registers t1, t2 and S (Steps S12 and S13), and sets the flag F1 showing automatic lubricating operation being executed (Step S14), by which the automatic lubrication process of this cycle is finished.

As the result that the flag F1 is set, in the automatic lubrication process of the next cycle, the determination result of Step S1 becomes Yes. Then, it is determined whether or not the value of the counter L reaches the operation time Tp of the lubricating pump 2 (Step S15). At the present stage immediately after the start of operation of the lubricating pump 2, the determination result is No. Therefore, the PC CPU 18 increases the value of the counter L by 1 (Step S28), by which the automatic lubrication process of this cycle is finished.

Thereafter, only the processes of Steps S1, S15 and S28 are repeatedly executed for each predetermined cycle. During this time, if it is judged in the determination process of Step S15 that the value of the counter L has reached the operation time Tp of the lubricating pump 2, the PC CPU 18 stops the operation of the lubricating pump 2 (Step S16), resets the counter L and the flag F1 (Step S17), and subtracts the quantity g' of grease delivered by one automatic lubricating operation from the present value of a grease residual quantity storage register g (initial value is gf) storing the residual quantity of grease in the reserve tank to update the value of residual quantity g of grease in the reserve tank (Step S18).

The PC CPU 18 divides the present value g of residual quantity of grease by the delivery quantity g' (setting value) of grease for one cycle to determine the number of automatic lubricating operations [g/g'] capable of being executed with the grease remaining in the reserve tank, multiplies this value by the present value Ls of lubrication interval to determine the remaining time [(g/g')×Ls] for which normal automatic lubricating operation can be continued without the refilling of grease to the reserve tank, and displays the remaining time together with the present value g of residual quantity of grease on a display of the manual data input device 29 to tell the effect to the operator (Step S19).

The operation time Tp of the lubricating pump 2 is set considering the change in viscosity of grease caused by the fluctuations in the ambient temperature t2. Therefore, the quantity of grease actually delivered by one automatic lubricating operation is kept at a substantially fixed value approximate to the setting value g', and the residual quantity g of grease in the reserve tank and the remaining time [(g/g')×Ls] can be calculated exactly as compared with the conventional lubricator.

If the present time is read from a clock built in the controller 10, [(g/g')×Ls] is added to this value, and the sum is displayed, predicted date and time when the refilling of grease is needed can be displayed in place of the allowance time until the refilling of grease.

Next, the PC CPU 18 determines whether or not the residual quantity g of grease in the reserve tank has decreased to a degree such that the refilling of grease is needed, for example, whether or not the residual quantity g is not larger than 10% of the maximum storage quantity gf in the reserve tank (Step S20). If the residual quantity g of grease exceeds 10% of the maximum storage quantity gf, the refilling work of grease to the reserve tank need not be performed for a while, so that the automatic lubrication process of this cycle is finished without being further executed.

Thereupon, when there is a margin for residual quantity g of grease in the reserve tank, that is, when the determination result of Step S20 is No, the display of the residual quantity g of grease in the reserve tank and the remaining time [(g/g')×Ls] is only updated by the processes of Steps S18 and S19 and displayed.

Since both of the flags F1 and F2 are set at 0 from the next cycle, the processes of Steps S1 to S7 are repeatedly executed for each predetermined cycle in the same manner as described before. If the value of the counter L exceeds the lubrication interval Ls, the processes of Steps S8 to S14 are executed, and the processes of Steps S1, S15 and S28 are repeatedly executed until the value of the counter L reaches the operation time Tp of the lubricating pump 2. If L≧³ Tp, the processes of Steps S16 to S20 are executed. Thereafter, these processes are repeatedly executed, and automatic lubricating operation is repeatedly performed for the pump operation time Tp considering the ambient temperature t2 for each lubrication interval Ls considering the cycle time S and the ball screw temperature t1 of injection molding machine.

If the determination result of Step S20 becomes Yes during the time when the automatic lubricating operation is repeatedly performed, and it is judged that the residual quantity g of grease in the reserve tank has decreased to a degree such that the refilling of grease is needed, the PC CPU 18 displays an alarm message that the reserve tank should be refilled with grease on the display of the manual data input device 29 to tell the effect to the operator (Step S21), and sets the flag F2 showing a waiting state of refilling of grease to the reserve tank (Step S22).

Next, the PC CPU 18 determines whether or not the refilling of grease to the reserve tank has been finished (Step S23). Since the refilling work of grease by the operator is not finished in the same process cycle, the determination result is No. Therefore, the PC CPU 18 executes the processes of Steps S3 to S7 in the same cycle in the same manner as described before, and then finishes the automatic lubrication process of this cycle.

As the result that the flag F2 is set, in the automatic lubrication process in the next and subsequent cycle, the processes of Steps S1, S2, S23, and S3 to S7 are repeatedly executed, and the PC CPU 18 enters a waiting state for waiting the refilling of grease to the reserve tank. During this time, the determination process of Step S23 is repeatedly executed, and whether or not the reserve tank has been refilled with grease is checked by the PC CPU 18.

Even if an alarm message that the reserve tank should be refilled with grease is displayed on the display of the manual data input device 29, about 10% of the maximum storage quantity gf of grease remains in the reserve tank. Therefore, several automatic lubricating operations can be performed continuously in this state. Thereupon, when the next lubrication interval Ls comes before the operator refills the reserve tank with grease, the processes of Steps S8 to S14, S16 to S22, and S28 are repeatedly executed in the same manner as described before, and the automatic lubricating operation for the injection molding machine is performed without trouble.

Since the alarm message is displayed in the state in which some quantity of grease remains in the reserve tank, even if a variation occurs in the actual delivery quantity of grease used for one automatic lubricating operation, for example, even if the actual delivery quantity of grease becomes larger than the estimated value g', the automatic lubricating operation can be performed during the time until the reserve tank is refilled with grease, so that the actual lubricating operation is not hindered.

The operator, who has checked the alarm message of refilling of grease during this time, refills the reserve tank with grease and operates a refill finish button on the manual data input device 29. Then, the PC CPU 18 detects this operation in the determination process of Step S23, and updates the value of the register g storing the residual quantity of grease to the maximum storage quantity gf (Step S24). Next, the PC CPU 18 releases the alarm display on the display of the manual data input device 29 (Step S25), and resets the flag F2 showing the waiting state of refilling of grease to the reserve tank (Step S26). Thereafter, the PC CPU 18 determines the present value g of residual quantity of grease and the remaining time [(g/g')×Ls] for which normal lubricating operation can be continued without refilling of grease, and displays the present value g of residual quantity of grease and the remaining time [(g/g')×Ls] on the display of the manual data input device 29 (Step S27), and executes the processes of Steps S3 to S7 in the same manner as described before, by which the automatic lubrication process of this cycle is finished.

If it is judged in the determination process of Step S7 that the value of the counter L counts the lubrication interval Ls in the automatic lubrication process in the next and subsequent cycle, on each occasion the lubricating pump 2 is operated for the operation time Tp according to the ambient temperature, so that the automatic lubricating operation is performed. Also, if it is judged in the process of Step S20 that the quantity g of grease in the reserve tank decreases and becomes smaller than 10% of the total quantity, the alarm message of refilling of grease is displayed again. By referring to this alarm message, the operator refills the reserve tank with grease. Thereafter, this operation is repeated.

The above is a description of an example as one embodiment in which the quantity of grease delivered by one automatic lubricating operation is kept at a substantially constant value by controlling the operation time Tp of the lubricating pump 2 based on the ambient temperature t2. However, a pressure sensor for detecting the rise in pressure of grease may be installed on the terminal lubricating unit 7 so that the operation of the lubricating pump 2 is stopped at the stage at which the detected pressure reaches a setting value. In this case, the calculation process of the operation time Tp in Step S9 is unnecessary. It is necessary only that after the lubricating pump 2 is operated in the process of Step S11, the operation of the lubricating pump 2 be stopped by determining in the process of Step S11 whether or not the detected pressure of the pressure sensor has reached the setting value. Naturally, the process of Step S8 is unnecessary.

In particular, in the case where not only the ambient temperature varies, but various kinds of grease with different viscosity etc. are used to test its suitability for a lubricant for injection molding machine, that is, in the case where conditions other than ambient temperature have an effect on the lubrication state, it is more reliable that the lubricating pump 2 is operated until the rise in pressure of grease on the terminal lubricating unit 7 is detected.

Also, in the above-described embodiment, the mean value of the cycle time S, ball screw temperature t1, and ambient temperature t2 has been determined. However, the mean value is not determined, and the lubrication interval Ls, the correction value ΔDL therefor, and the operation time Tp of the lubricating pump 2 may be determined based on the cycle time S, ball screw temperature t1, and ambient temperature t2 at the stage at which the counter L reaches the lubrication interval Ls. In this case, the processes of Steps S6 and S8 are unnecessary.

In the above-described embodiment, temperature has been measured with the temperature detector 8 installed on the lubricating unit 7 formed by the socket installed to the ball screw to represent the load of injection molding machine. However, the load (calorific value) of injection molding machine may be measured with a temperature detector installed on the lubricating unit 7 of the socket of ball screw for injection mechanism, the pivotally mounting sleeve provided in the rocking section of toggle mechanism, or the like. Also, temperature detectors may be arranged at several places to measure the load of injection molding machine by averaging the detected values.

Figure 7:
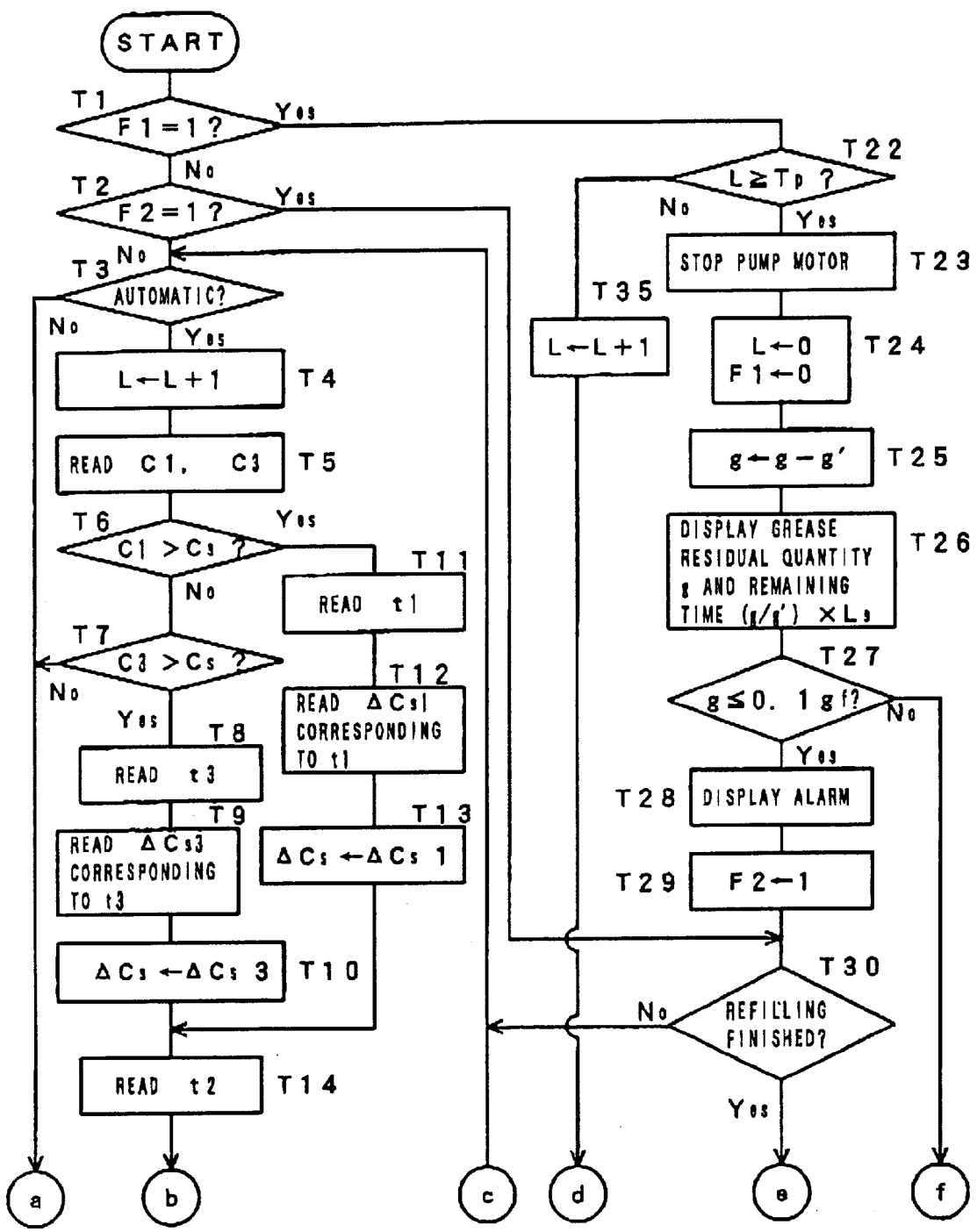
FIG. 7 is a flowchart showing one example of another process for carrying out adaptive control of automatic lubricating operation.
Figure 8:
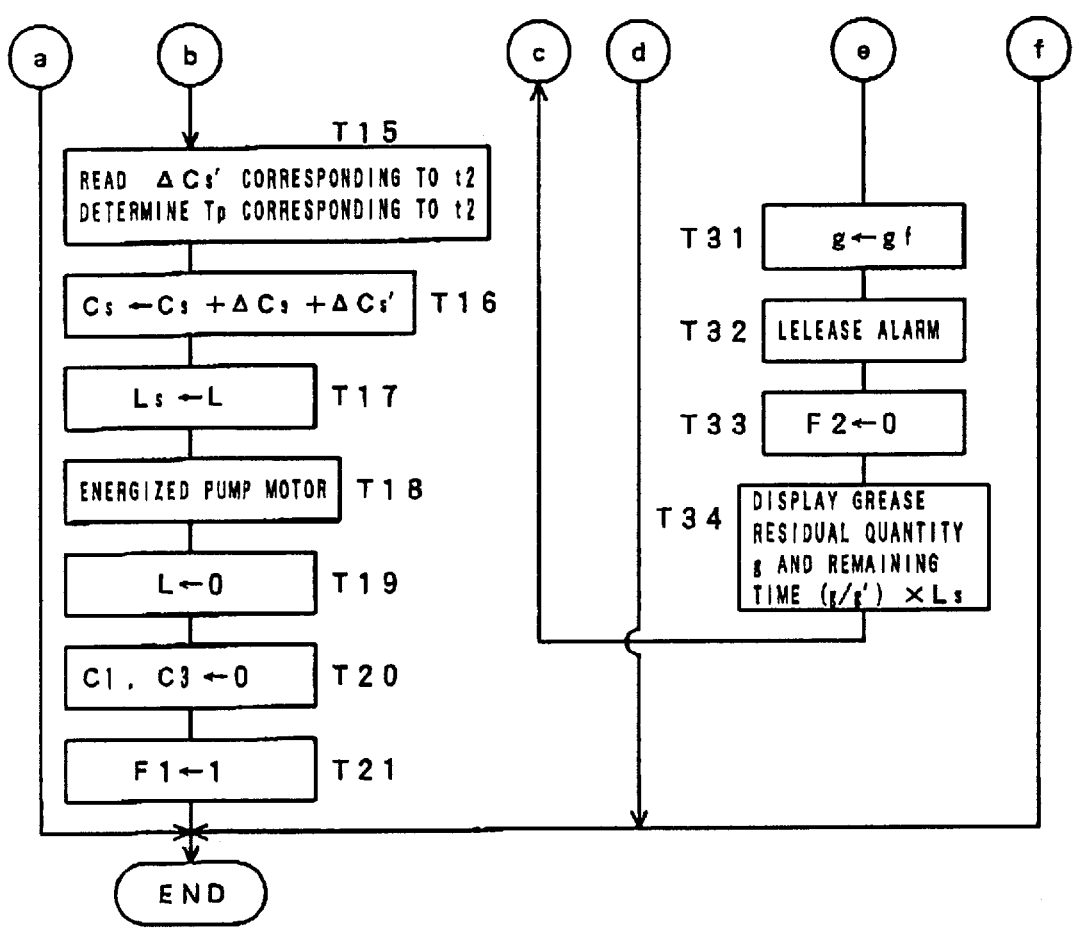
FIG. 8 is a flowchart showing one example of another process for carrying out adaptive control of automatic lubricating operation.

Next, another embodiment will be described with reference to a flowchart for automatic lubrication process shown in FIG. 7, in which embodiment, a counter C1 for counting the number of mold clamping operations, a counter C3 for counting the number of injections, and a temperature detector 30 for detecting the temperature of injection ball screw are provided on the injection molding machine side, and the lubrication interval is adaptively controlled by controlling a setting value Cs of the number of shots by which the lubricating operation is performed.

Although in the above-described embodiment, the lubrication interval has been controlled by the setting value Ls of time, this embodiment differs from the above-described embodiment in that the lubrication interval is controlled by the setting value Cs of the substantial number of shots. Further, as in the case of mold clamping control work and purging work, considering a case where only a particular portion of injection molding machine such as an injection mechanism or a mold clamping mechanism is driven, both of the number of injections C3 and the number of mold clamping operations C1 are detected as the number of shots, and when at least one of the two reaches the setting value Cs of the number of shots, lubrication is effected, by which the running out of grease due to the driving of the particular portion is prevented.

The PC CPU 18, which has started the automatic lubrication process for each predetermined cycle, first determines whether or not a flag F1 showing automatic lubricating operation being executed is set (Step T1), and whether or not a flag F2 showing a waiting state of refilling of grease to the reserve tank is set (Step T2). Since the automatic lubricating operation is not being performed at the initial stage after the start of process, and the reserve tank is fill of grease, neither flag is set. Therefore, the determination results of Steps T1 and T2 are No.

Then, the PC CPU 18 determines whether automatic operation is selected or manual operation (including semi-automatic operation) is selected as the operation mode of injection molding machine (Step T3). If automatic operation is not selected, the automatic lubrication process of this cycle is finished without being further executed. The values of the counter C1 for counting the number of mold clamping operations and the counter C3 for counting the number of injections are automatically counted up by one reciprocating operation of the mold clamping mechanism or one reciprocating operation of the injection screw independently of automatic operation and manual operation (including semi-automatic operation).

On the other hand, if automatic operation is selected, the PC CPU 18 first increases the value of the counter L forming the timer by 1, and updates and stores the elapsed time from the previous automatic lubricating operation (Step T4). Then, the PC CPU 18 reads the values of the molding clamping counter C1 and the injection counter C3 (Step T5), and determines whether or not the present value of the mold clamping counter C1 reaches the setting value Cs of the number of shots by which the lubricating operation is performed (Step T6). If the determination result is No, the PC CPU 18 further determines whether or not the present value of the injection counter C3 reaches the setting value Cs (step T7).

If the present values of both counters do not reach the setting value Cs, automatic lubricating operation need not yet be performed at this stage, so that the PC CPU 18 finishes the automatic lubrication process of this cycle without further executing it.

Thereafter, until the present value of the mold clamping counter C1 or that of the injection counter C3 reaches the initial setting value Cs of lubrication interval, only the processes of Steps T1 to T7 are repeatedly executed.

If during the time when such processes are repeatedly executed, it is judged in the determination process of Step T6 that the present value of the mold clamping counter C1 has reached the initial setting value Cs of the number of shots at the lubrication interval, the PC CPU 18 reads the present value t1 of the mold clamping ball screw temperature via the temperature detector 8 for the mold clamping ball screw (Step T11), determines a correction value ΔDCs1 of lubrication interval corresponding to the present value t1 of the mold clamping ball screw temperature by referring to the data file in the nonvolatile memory 24 (Step T12), and stores this value in a correction value storage register ΔDCs (Step T13).

If the correction value ΔDCs1 is replaced with ΔDL, the logical structure of data file regarding the mold clamping ball screw temperature t1 is substantially the same as that of the aforementioned data file shown in FIG. 4. In this embodiment, however, since the lubrication interval is controlled on the basis of the number of executions of shot, in the correction value column of data file corresponding to FIG. 4, the correction value ΔDCs1 (integral number) of the number of executions of shot, not the correction value ΔDL of time, is stored.

On the other hand, during the time when the processes of Steps T1 to T7 are repeatedly executed, if it is judged in the determination process of Step T7 that the present value of the injection counter C3 has reached the initial setting value Cs of the number of shots at the lubrication interval, the PC CPU 18 reads the present value t3 of the injection ball screw temperature via the temperature detector 30 for the injection ball screw (Step T8), determines a correction value ΔDCs3 of lubrication interval corresponding to the present value t3 of the injection ball screw temperature by referring to the data file in the nonvolatile memory 24 (Step T9), and stores this value in a correction value storage register ΔDCs (Step T10).

The logical structure of the data file regarding the injection ball screw temperature t3 is also substantially the same as that of the data file shown in FIG. 4. In this embodiment, however, since the lubrication interval is controlled on the basis of the number of executions of shot, in the correction value column of data file corresponding to FIG. 4, the correction value ΔDCs3 (integral number) of the number of executions of shot, not the correction value ΔDL of time, is stored as in the case of the aforementioned data file of mold clamping ball screw temperature t1.

The CP CPU 18, which has determined the correction value ΔDCs of lubrication interval based on the temperature of ball screw having the larger number of operations in the process of Step T13 or T10, reads the present value t2 of ambient temperature via the thermometer 9 (Step T14), and determines the correction value ΔDCs' of lubrication interval for the ambient temperature t2 and the value of operation time Tp of the lubricating pump 2 corresponding to the ambient temperature t2 (Step T15).

The structure of the data file storing the correction value ΔDCs' (integral number) of lubrication interval for the ambient temperature t2 is as shown in FIG. 4 like the logical structure of the data file regarding the mold clamping ball screw temperature t1 and injection ball screw temperature t3. Also, the structure of the data file storing the operation time Tp of the lubricating pump 2 corresponding to the ambient temperature t2 is exactly the same as that shown in the aforementioned FIG. 5.

Next, the CP CPU 18 adds the correction value ΔDCs of lubrication interval based on the ball screw temperature and the correction value ΔDCs' of lubrication interval based on the ambient temperature t2 to the present setting value Cs of the number of shots for carrying out lubrication to correct the setting value Cs of the number of shots for carrying out lubrication to a value Cs considering the temperature t1 or t3 of ball screw having the larger number of operations (Step T16).

As described above, when the value of the injection counter C3 first reaches the setting value Cs by driving the injection mechanism only, the value of the injection ball screw temperature t3 is considered. Also, when the value of the mold clamping counter C1 first reaches the setting value Cs by driving the mold clamping mechanism only, the value of the mold clamping ball screw temperature t1 is considered.

Then, the CP CPU 18 stores the present value of the counter L, that is, the required time from the previous automatic lubricating operation to the present automatic lubricating operation in a register Ls (Step T17), gives an operation command to the lubricating pump 2 to start the delivery of grease (Step T18), resets the values of the counters L, C1 and C3 (Steps T19 and T20), and sets the flag F1 showing automatic lubricating operation being executed (Step T21), by which the automatic lubrication process of this cycle is finished.

As the result that the flag Fl is set, in the automatic lubrication process of the next cycle, the determination result of Step T1 becomes Yes. Then, it is determined whether or not the value of the counter L reaches the operation time Tp of the lubricating pump 2 (Step T22). At the present stage immediately after the start of operation of the lubricating pump 2, the determination result is No. Therefore, the PC CPU 18 increases the value of the counter L by 1 (Step T35), by which the automatic lubrication process of this cycle is finished.

Thereafter, only the processes of Steps T1, T22 and T35 are repeatedly executed for each predetermined cycle. During this time, if it is judged in the determination process of Step T22 that the value of the counter L has reached the operation time Tp of the lubricating pump 2, the PC CPU 18 stops the operation of the lubricating pump 2 (Step T23), resets the counter L and the flag F1 (Step T24), and subtracts the quantity g' of grease delivered by one automatic lubricating operation from the present value of a grease residual quantity storage register g (initial value is gf) storing the residual quantity of grease in the reserve tank to up date the value of residual quantity g of grease in the reserve tank (Step T25).

The PC CPU 18 divides the present value g of residual quantity of grease by the delivery quantity g' (setting value) of grease for one cycle to determine the number of automatic lubricating operations [g/g'] capable of being executed with the grease remaining in the reserve tank, multiplies this value by the value Ls of time corresponding to the substantial lubrication interval to determine the remaining time [(g/g')×Ls] for which normal automatic lubricating operation can be continued without the refilling of grease to the reserve tank, and displays the remaining time together with the present value g of residual quantity of grease on the display of the manual data input device 29 to tell the effect to the operator (Step T26).

The operation time Tp of the lubricating pump 2 is set considering the change in viscosity of grease caused by the fluctuations in the ambient temperature t2. Therefore, the quantity of grease actually delivered by one automatic lubricating operation is kept at a substantially fixed value approximate to the setting value g', and the residual quantity g of grease in the reserve tank and the remaining time [(g/g')×Ls] can be calculated exactly as compared with the conventional lubricator.

If the present time is read from the clock built in the controller 10, [(g/g')×Ls] is added to this value, and the sum is displayed, predicted date and time when the refilling of grease is needed can be displayed in place of the allowance time until the refilling of grease.

Next, the PC CPU 18 determines whether or not the residual quantity g of grease in the reserve tank has decreased to a degree such that the refilling of grease is needed, for example, whether or not the residual quantity g is not larger than 10% of the maximum storage quantity gf in the reserve tank (Step T27). If the residual quantity g of grease exceeds 10% of the maximum storage quantity gf, the refilling work of grease to the reserve tank need not be performed for a while, so that the automatic lubrication process of this cycle is finished without being further executed.

Thereupon, when there is a margin for residual quantity g of grease in the reserve tank, that is, when the determination result of Step T27 is No, the display of the residual quantity g of grease in the reserve tank and the remaining time [(g/g')×Ls] is only updated by the processes of Steps T25 and T26 and displayed.

Since both of the flags F1 and F2 are set at 0 from the next cycle, the processes of Steps T1 to T7 are repeatedly executed for each predetermined cycle in the same manner as described before. If the value of the counter C1 or C3 exceeds the setting value Cs of the number of shots corresponding to the lubrication interval, the processes of Steps T11 to ST13 or Steps T8 to T10 and Steps T14 to T21 are executed, and the processes of Steps T1, T22 and T35 are repeatedly executed until the value of the counter L reaches the operation time Tp of the lubricating pump 2. If L≧³Tp, the process of Step T27 is executed. Thereafter, these processes are repeatedly executed, the temperature t1 or t3 of ball screw having the larger number of operations takes precedence, and automatic lubricating operation is repeatedly performed for the pump operation time Tp considering the ambient temperature t2 for each number of shots Cs of lubrication interval considering the ambient temperature t2.

If the determination result of Step T27 becomes Yes during the time when the automatic lubricating operation is repeatedly performed, and it is judged that the residual quantity g of grease in the reserve tank has decreased to a degree such that the refilling of grease is needed, the PC CPU 18 displays an alarm message that the reserve tank should be refilled with grease on the display of the manual data input device 29 to tell the effect to the operator (Step T28), and sets the flag F2 showing a waiting state of refilling of grease to the reserve tank (Step T29).

Next, the PC CPU 18 determines whether or not the refilling of grease to the reserve tank has been finished (Step T30). Since the refilling work of grease by the operator is not finished in the same process cycle, the determination result is No. Therefore, the PC CPU 18 executes the processes of Steps T3 to T7 in the same cycle in the same manner as described before, and then finishes the automatic lubrication process of this cycle.

As the result that the flag F2 is set, in the automatic lubrication process in the next and subsequent cycle, the processes of Steps T1, T2, T30, and T3 to T7 are repeatedly executed, and the PC CPU 18 enters a waiting state for waiting the refilling of grease to the reserve tank. During this time, the determination process of Step T30 is repeatedly executed, and whether or not the reserve tank has been refilled with grease is checked by the PC CPU 18.

Even if an alarm message that the reserve tank should be refilled with grease is displayed on the display of the manual data input device 29, about 10% of the maximum storage quantity gf of grease remains in the reserve tank. Therefore, several automatic lubricating operations can be performed continuously in this state. Thereupon, when the next lubrication interval Ls comes before the operator refills the reserve tank with grease, the processes of Steps T11 to T13 or T7 to T10, and Steps T14 to T21 and T23 to T29 and T35 are repeatedly executed in the same manner as described before, and the automatic lubricating operation for the injection molding machine is performed without trouble.

Since the alarm message is displayed in the state in which some quantity of grease remains in the reserve tank, even if a variation occurs in the actual delivery quantity of grease used for one automatic lubricating operation, for example, even if the actual delivery quantity of grease becomes larger than the estimated value g', the automatic lubricating operation can be performed during the time until the reserve tank is refilled with grease, so that the actual lubricating operation is not hindered.

The operator, who has checked the alarm message of refilling of grease during this time, refills the reserve tank with grease and operates the refill finish button on the manual data input device 29. Then, the PC CPU 18 detects this operation in the determination process of Step T30, and updates the value of the register g storing the residual quantity of grease to the maximum storage quantity gf (Step T31). Next, the PC CPU 18 releases the alarm display on the display of the manual data input device 29 (Step T32), and resets the flag F2 showing the waiting state of refilling of grease to the reserve tank (Step T33). Thereafter, the PC CPU 18 determines the present value g of residual quantity of grease and the remaining time [(g/g')×Ls] for which normal lubricating operation can be continued without the refilling of grease, and displays the present value g of residual quantity of grease and the remaining time [(g/g')× Ls] on the display of the manual data input device 29 (Step T34), and executes the processes of Steps T3 to T7 in the same manner as described before, by which the automatic lubrication process of this cycle is finished.

If it is judged in the determination process of Step T6 or T7 that the value of the counter C1 or C3 counts the number of shots Cs of lubrication interval in the automatic lubrication process in the next and subsequent cycle, on each occasion the lubricating pump 2 is operated for the operation time Tp according to the ambient temperature, so that the automatic lubricating operation is performed. Also, if it is judged in the process of Step T27 that the quantity g of grease in the reserve tank decreases and becomes smaller than 10% of the total quantity, the alarm message of refilling of grease is displayed again. By referring to this alarm message, the operator refills the reserve tank with grease. Thereafter, this operation is repeated.

According to this embodiment, both of the values of the mold clamping counter C1 and the injection counter C3 are detected as the substantial number of shots, and lubricating operation is performed at the stage at which either one of these values reaches the setting value Cs of the number of shots for carrying out lubrication. Therefore, as in the case of mold clamping control work and purging work by manual operation, even when only a particular portion of injection molding machine such as the injection mechanism or the mold clamping mechanism is driven, the occurrence of running out of grease in the particular portion can be prevented.

According to the present invention, since the lubricating conditions is adaptively controlled according to the operation environment of injection molding machine, even if the cycle time and load of injection molding machine, ambient temperature, and the like are varied, proper automatic lubricating operation can be performed, and the injection molding machine can be used in a satisfactory condition for a long period of time.

Also, since the quantity of grease consumed for one automatic lubricating operation is kept constant by the proper lubricating conditions, the residual quantity of grease and the remaining time until the refilling of grease is needed, or the date and time when the refilling of grease is needed can be predicted exactly. Moreover, since the residual quantity of grease and the remaining time or the date and time when the refilling of grease is needed are displayed on the display, the running out of grease can be prevented by refilling the reserve tank with grease at a proper time.

Further, even when only a particular portion of injection molding machine such as the injection mechanism or the mold clamping mechanism is operated, the occurrence of running out of grease in the particular portion can be prevented.

What is claimed is:

1. An automatic lubricator for an injection molding machine, comprising:
   a lubricating pump to supply lubricant to movable parts of the injection molding machine; and
   a controller to control an interval between operation of said lubricating pump based on a mean cycle time of the injection molding machine.

2. An automatic lubricator for an injection molding machine as recited in claim 1, wherein said controller controls the interval of operation of said lubricating pump based on the mean cycle time of the injection molding machine and based on a temperature of a lubricated part.

3. An automatic lubricator for an injection molding machine as recited in claim 1, wherein said controller further controls an amount of tune said lubricating pump is operated for one lubrication based on an ambient temperature of the injection molding machine from a previous lubricating operation to a present time.

4. An automatic lubricator for an injection molding machine as recited in claim 1, wherein said controller controls the interval of operation of said lubricating pump based on the mean cycle time of the injection molding machine and a mean temperature of the lubricated part.

5. An automatic lubricator for an injection molding machine as recited in claim 4, wherein the controller further controls an amount of time said lubricating pump is operated for one lubrication based on a mean ambient temperature of the injection molding machine from a previous lubricating operation to a present time.

6. An automatic lubricator for an injection molding machine as recited in claim 4, wherein said controller determines the interval of operation of said lubricating pump by determining the mean cycle time of the injection molding machine, and adjusts the mean cycle time according to a correction value corresponding to the mean temperature of the lubricated part.

7. An automatic lubricator for an injection molding machine, comprising:
   a lubricating pump to supply lubricant to movable parts of the injection molding machine; and
   a controller to control an interval between operation of said lubricating pump based on a temperature of a lubricated part.

8. An automatic lubricator for an injection molding machine, comprising:
   a lubricating pump to supply lubricant to movable parts of the injection molding machine; and
   a controller to control an interval between operation of said lubricating pump based on a mean temperature of a lubricated part.

9. An automatic lubricator for an injection molding machine as recited in claim 7, wherein the controller controls the interval between operation of said lubricating pump based on the temperature of the lubricated part and a cycle time of the injection molding machine.

10. An automatic lubricator for an injection molding machine as recited in claim 9, wherein the controller further controls an amount of time said lubricating pump is operated for one lubrication based on an ambient temperature of the injection molding machine.

11. An automatic lubricator for an injection molding machine, comprising:

a lubricating pump to supply lubricant to movable parts of the injection molding machine; and a controller to control an amount of time said lubricating pump is operated for one lubrication based on an ambient temperature of the injection molding machine.

12. An automatic lubricator for an injection molding machine, comprising:

a lubricating pump to supply lubricant to movable parts of the injection molding machine; and a controller to control an amount of time said lubricating pump is operated for one lubrication based on a mean value of ambient temperature of the injection molding machine from a previous lubricating operation to a present time.

13. An automatic lubricator for an injection molding machine, comprising:

a lubricating pump to supply lubricant to movable parts of the injection molding machine; and a controller to control an interval of operation of said lubricating pump or operating time of said lubricating pump for one lubrication based on at least one of cycle time of the injection molding machine, temperature of the lubricated parts and ambient temperature of the injection molding machine, wherein said controller makes said lubricating pump perform the lubricating operation each time a set number of shots are completed and also adaptively controls said lubrication interval by adjusting the set number of shots.

14. An automatic lubricator for an injection molding machine according to claim 13, wherein said controller makes said lubricating pump perform the lubricating operation each time at least one of the number of injection operations and the number of mold clamping operations of the injection molding machine reaches said set number of shots.

15. An automatic lubricator for an injection molding machine, comprising:

a lubricating pump to supply lubricant to movable parts of the injection molding machine; and a controller to control an interval of operation of said lubricating pump or operating time of said lubricating pump for one lubrication based on at least one of cycle time of the injection molding machine, temperature of the lubricated parts and ambient temperature of the injection molding machine, wherein said automatic lubricator further comprises a display device, and said controller makes said display device display at least one of the residual quantity of lubricant in a reserve tank, remaining time until refilling of lubricant is needed, and date and time when the refilling of lubricant is needed.

* * * * *

UNITED STATES PATENT AND TRADEMARK OFFICE
CERTIFICATE OF CORRECTION

PATENT NO. : 6,179,597 B1
DATED : January 30, 2001
INVENTOR(S) : Susumu Ito, et al.

It is certified that error appears in the above-identified patent and that said Letters Patent is hereby corrected as shown below:

Column 4,
Line 12, change "S" to -- 5 --.

Column 14,
Line 32, change "tune" to -- time --.

Signed and Sealed this

Twenty-fifth Day of September, 2001

Attest:

NICHOLAS P. GODICI
Attesting Officer
Acting Director of the United States Patent and Trademark Office